(12) United States Patent
Lee et al.

(10) Patent No.: US 11,449,162 B2
(45) Date of Patent: Sep. 20, 2022

(54) TOUCH DISPLAY PANEL AND TOUCH DISPLAY DEVICE

(71) Applicant: LG DISPLAY CO., LTD., Seoul (KR)

(72) Inventors: Yangsik Lee, Gyeonggi-do (KR);
JiHyun Jung, Gyeonggi-do (KR);
DeukSu Lee, Gyeonggi-do (KR);
JaeGyun Lee, Gyeonggi-do (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/188,657

(22) Filed: Nov. 13, 2018

(65) Prior Publication Data
US 2019/0155428 A1    May 23, 2019

(30) Foreign Application Priority Data

Nov. 20, 2017    (KR) .................. 10-2017-0154452

(51) Int. Cl.
| | |
|---|---|
| *G06F 3/041* | (2006.01) |
| *G06F 3/044* | (2006.01) |
| *G06F 1/16* | (2006.01) |
| *H04M 1/03* | (2006.01) |

(Continued)

(52) U.S. Cl.
CPC .......... *G06F 3/0412* (2013.01); *G06F 1/1686* (2013.01); *G06F 1/1688* (2013.01); *G06F 3/044* (2013.01); *G06F 3/047* (2013.01); *G06F 3/0416* (2013.01); *H04M 1/0264* (2013.01); *H04M 1/03* (2013.01); *G06F 2203/04111* (2013.01)

(58) Field of Classification Search
CPC .... G06F 3/0412; G06F 3/0416; G06F 1/1684; G06F 1/1686; G06F 1/1688; G06F 2203/04111; H04M 1/0264
See application file for complete search history.

(56) References Cited

U.S. PATENT DOCUMENTS

| | | | |
|---|---|---|---|
| 9,503,554 B1 * | 11/2016 | Kuo | .................... H04M 1/0266 |
| 2008/0225216 A1 | 9/2008 | Shimodaira | |
| 2010/0225569 A1 | 9/2010 | Park et al. | |

(Continued)

FOREIGN PATENT DOCUMENTS

| | | |
|---|---|---|
| CN | 103353817 A | 10/2013 |
| CN | 105388973 A | 3/2016 |

(Continued)

OTHER PUBLICATIONS

Search Report dated Mar. 19, 2019 issued in the corresponding European Patent Application No. 18207316.3, pp. 1-8.

(Continued)

*Primary Examiner* — Dennis P Joseph
(74) *Attorney, Agent, or Firm* — Polsinelli PC

(57) ABSTRACT

Aspects of the present disclosure relate to a touch display panel and a touch display device. In a structure in which a function module is disposed in an active area of a touch display panel, by providing a structure in which touch sensors or touch lines adjacent to the function module are connected through a connecting pattern disposed outside the function module or a sensor connection line disposed in a bezel area of the function module, it is possible to provide a touch sensing function throughout the entire area where images are displayed in a structure including an area, where images are not displayed, such as a function module in an active area.

18 Claims, 21 Drawing Sheets

(51) Int. Cl.
*H04M 1/02* (2006.01)
*G06F 3/047* (2006.01)

(56) References Cited

U.S. PATENT DOCUMENTS

| | | | |
|---|---|---|---|
| 2010/0244057 A1 | 9/2010 | Ryu et al. | |
| 2015/0355768 A1 | 12/2015 | Kuwahara et al. | |
| 2017/0153749 A1 | 6/2017 | Noguchi | |
| 2017/0162637 A1 | 6/2017 | Choi et al. | |
| 2017/0183298 A1 | 6/2017 | Vuligonda et al. | |
| 2017/0235398 A1* | 8/2017 | Choi | G06F 3/0416 345/173 |
| 2018/0226454 A1 | 8/2018 | Liu et al. | |
| 2018/0308903 A1* | 10/2018 | Jeong | H01L 27/323 |
| 2019/0034011 A1* | 1/2019 | Li | G06F 3/0412 |

FOREIGN PATENT DOCUMENTS

| | | |
|---|---|---|
| CN | 106462019 A | 2/2017 |
| CN | 206058160 U | 3/2017 |
| CN | 106775173 A | 5/2017 |
| CN | 107340942 A | 11/2017 |
| EP | 2 955 611 A1 | 12/2015 |
| EP | 3 176 771 A2 | 6/2017 |
| FR | 3 033 422 A1 | 9/2016 |
| FR | 3033422 A | 9/2016 |
| JP | 2010-225269 A | 10/2010 |
| JP | 2015-050245 A | 3/2015 |
| JP | 2015-231444 A | 12/2015 |
| JP | 2019-061323 A | 4/2019 |
| KR | 101452301 B1 | 10/2014 |
| KR | 20170066767 A | 6/2017 |
| TW | 201624263 A | 7/2016 |

OTHER PUBLICATIONS

Japanese Office Action dated Nov. 5, 2019 issued in corresponding Application No. 2018-213139 (6 pages).
Taiwanese Office Action dated Jul. 10, 2020 issued in corresponding Patent Application No. 107140277 (8 pages).
Japanese Office Action dated Aug. 31, 2021 issued in corresponding Patent Application No. 2020-116508 w/Partial English Translation (6 pages).
Chinese Office Action dated Nov. 1, 2021 issued in corresponding Patent Application No. 201811301166.1 w/English Translation (18 pages).
Taiwanese Notice of Allowance dated Jul. 28, 2022 issued in corresponding Patent Application No. 119192541 w/English Translation (8 pages).
Chinese Office Action dated Jun. 21, 2022 issued in corresponding Patent Application No. 201811301166.1 w/English Translation (21 pages).
Korean Office Action dated Aug. 4, 2022 issued in corresponding Patent Application No. 10-2022-0081621 (6 pages).

* cited by examiner

TOUCH DISPLAY PANEL AND TOUCH DISPLAY DEVICE

CROSS REFERENCE TO RELATED APPLICATION

This application claims priority from Korean Patent Application No. 10-2017-0154452, filed on Nov. 20, 2017, which is hereby incorporated by reference in its entirety for all purposes as if fully set forth herein.

BACKGROUND

Field of the Disclosure

The present disclosure relates to a display device, and more particularly, to a touch display panel and a touch display device. Although the present disclosure is suitable for a wide scope of applications, it is particularly suitable for designing touch sensors and touch lines of a display panel for sensing touches without influencing structural and functional characteristics when a component disposed at a non-active area is disposed at an active area of the display panel.

Description of the Background

With the development of information society, demand of users for display devices that display images has increased, and various display devices, such as a liquid crystal display device, a plasma display device, and an organic light emitting display device, are used.

In order to provide various functions for users, recently, display devices provide a function of recognizing a touch on a display panel by a user and processing input on the basis of the recognized touch.

For example, it is possible to sense whether there is a touch on a display panel by a user and the position of the touch by sensing a change in a capacitance value that is caused when a user touches the display panel, using a touch sensor in the display panel.

In display devices that can sense a touch, a touch sensor for sensing a touch is disposed in the display panel, so the display panel can be increased in thickness and the display function of the display panel can be influenced.

Accordingly, there is a need for a measure that can dispose touch sensors or touch lines for sensing while minimizing influence on the structural characteristics and functional characteristics of display panels of the related art.

Furthermore, recently, because it is required to expand an area (an active area) where images are displayed on a display panel, some components that are disposed in an area (a non-active area) where images are not displayed in the related art may be disposed in the active area.

In this case, since new components are disposed in the active area, the structure of the active area may be changed. Further, there is a need for a measure that can design touch sensors and touch lines to be able to sense touches in the structure with the active area expanded and changed.

SUMMARY

An aspect of aspects of the present disclosure is to provide a touch display panel and a touch display device in which touch sensors and touch lines for sensing touches are disposed without influencing structural characteristics and functional characteristics of the display panel.

Another aspect of aspects of the present disclosure is to provide a touch display panel and a touch display device that can sense a touch in an active area that is changed in structure by expansion in the display panel.

According to an aspect, aspects of the present disclosure provide a touch display device including: a panel having an active area where images are displayed and a non-active area disposed outside the active area; at least one function module disposed in the active area; multiple first touch sensor groups disposed in a predetermined direction in the active area and each including one or more first touch sensors; and multiple second touch sensor groups disposed across the first touch sensor groups in the active area and each including one or more second touch sensors, in which the first touch sensors and the second touch sensors are disposed in an area except for the area where the function module is disposed in the active area.

According to another aspect, aspects of the present disclosure provide a touch display panel including: an active area where images are displayed; at least one function module disposed in the active area; multiple first touch sensor groups disposed in a predetermined direction in the active area and each including one or more first touch sensors; and multiple second touch sensor groups disposed across the first touch sensor groups in the active area and each including one or more second touch sensors, in which the function module is disposed between two first touch sensors of the first touch sensor groups, or between two second touch sensors of the second touch sensor groups, or between two first touch sensors of the first touch sensor groups and two second touch sensors of the second touch sensor groups.

According to another aspect, aspects of the present disclosure provide a touch display panel including: an active area where images are displayed; a non-active area disposed outside the active area; at least one function module disposed in the active area; multiple first touch sensor groups disposed in a predetermined direction in the active area and each including one or more first touch sensors; multiple second touch sensor groups disposed across the first touch sensor groups in the active area and each including one or more second touch sensors; at least one first touch line disposed in the non-active area and electrically connected with the first touch sensor groups; and at least one second touch line disposed in the non-active area and electrically connected with the second touch sensor groups, in which some of the first touch sensors and the other first touch sensors of any one (group A) of the first touch sensor groups are electrically connected with different first touch lines, respectively, and some of the second touch sensors and the other second touch sensors of any one (group B) of the second touch sensor groups are electrically connected with different second touch lines, respectively.

According to aspects of the present disclosure, by providing a structure in which touch sensors are disposed in an area except for an area where a function module is disposed and in which the touch sensors are connected with touch lines in an active area of a display panel, it is possible to sense a touch throughout the entire area where images are displayed in the display panel.

According to aspects of the present disclosure, since two touch sensors disposed around a function module are connected to each other through a connecting pattern disposed outside or inside the function module, it is possible to sense a touch around the function module.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
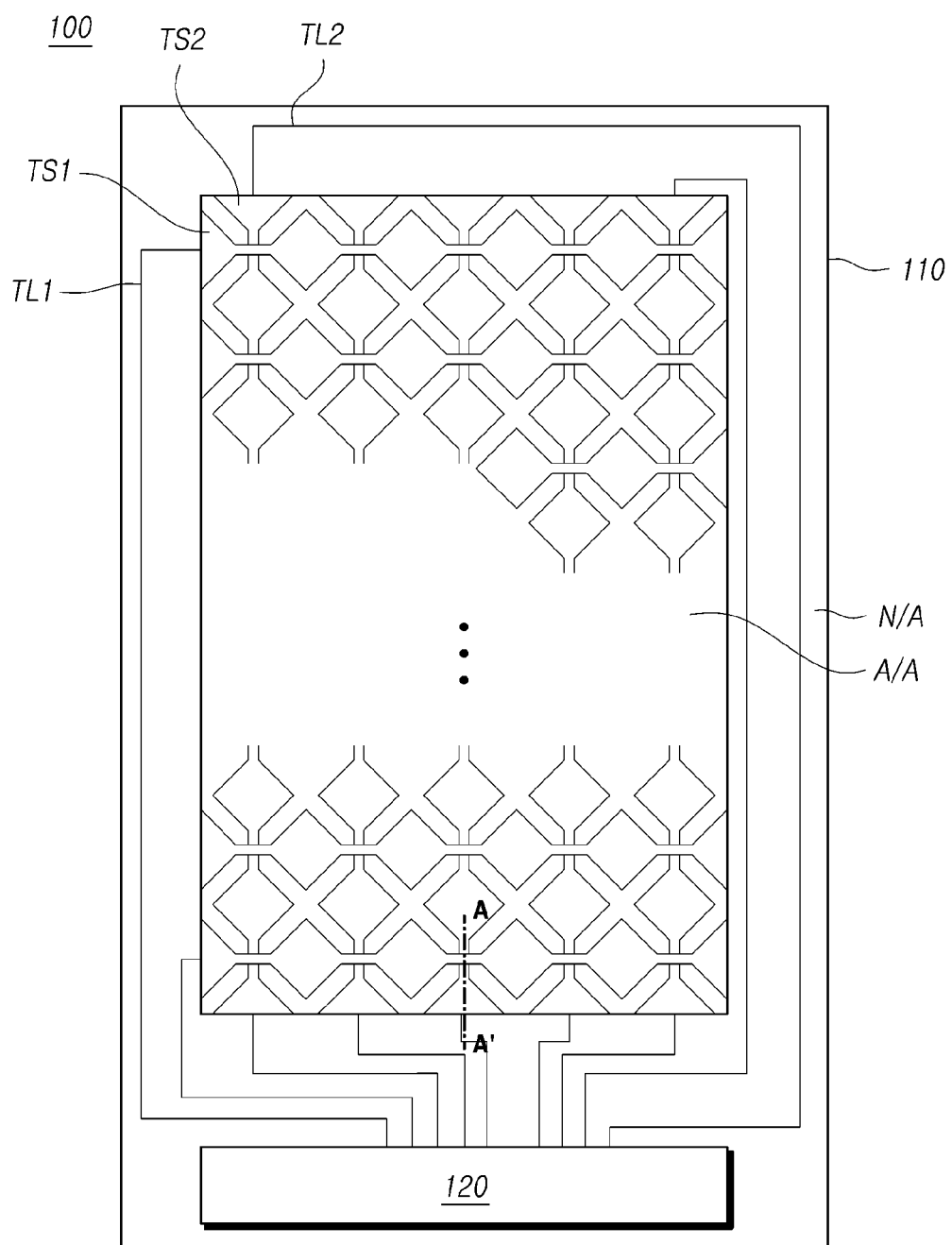
FIG. 1 is a diagram schematically showing a configuration of a touch display device according to an aspect of the present disclosure.

Hereinafter, some aspects of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. These terms are merely used to distinguish one component from other components, and the property, order, sequence and the like of the corresponding component are not limited by the corresponding term. In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

FIG. 1 is a diagram schematically showing a configuration of a touch display device 100 according to aspects of the present disclosure.

Referring to FIG. 1, a touch display device 100 according to aspects of the present disclosure may include a touch display panel 110 having multiple touch sensors TS (TS1, TS2, etc.) and multiple touch lines TL (TL1, TL2, etc.), and a touch driving circuit 120 that drives the touch sensors TS.

The touch display device 100 may include a fundamental configuration for display driving in addition to the configuration for touch sensing.

For example, in the touch display panel 110, multiple gate lines and multiple data lines may be disposed and multiple subpixels may be disposed in areas where the gate lines and data lines cross each other. The touch display panel 110 may be divided into an active area A/A where images are displayed and a non-active area N/A that is the other area except for the active area A/A.

The touch display panel 110 may include a gate driving circuit that drives the gate line, a data driving circuit that drives the data lines, and a controller that controls the gate driving circuit and the data driving circuit.

That is, the touch display device 100 according to aspects of the present disclosure may have a fundamental structure for display and may include a configuration for display driving and a configuration for touch sensing. The configuration for touch sensing is mainly described herein.

The touch sensors TS may be arranged in a separate panel type on the touch display panel 110 or may be arranged in the touch display panel 110.

When the touch sensors TS are arranged in the touch display panel 110, they may be electrodes that are used for display driving or may be electrodes that are separately arranged for touch sensing.

For example, when the touch display device 100 is a liquid crystal display device, common electrodes that are disposed on the touch display panel 110 may be used as touch sensors TS. That is, the common electrodes can function as touch sensors TS for touch sensing by receiving common voltage in a display driving period and receiving touch driving signals in a touch sensing period.

When the touch display device 100 is an organic light emitting display device, the touch sensors TS may be disposed on an encapsulation layer ENCAP of the touch display panel 110. Accordingly, it is possible to solve the problem that it is difficult to form touch sensors TS that are metallic elements in a panel due to organic substances and it is also possible to provide a touch sensing function to the organic light emitting display device.

Although a case in which the touch display device 100 according to aspects of the present disclosure is an organic light emitting display device is described hereafter, aspects of the present disclosure are not limited thereto.

The touch sensors TS may be transparent electrodes or mesh type electrodes. The touch sensors can be arranged in various structures in accordance with touch sensing methods.

For example, the touch sensors TS may be separately arranged on the touch display panel 110 and each may be connected with one touch line TL. The touch sensors TS can sense a touch by sensing a change is self-capacitance that is generated by a touch from a user (self-capacitance sensing type).

Alternatively, the touch sensors TS may be composed of first touch sensors TS1 and second touch sensors TS2 to which different levels of voltages are applied. It is also possible to sense a touch by sensing a change in mutual capacitance that is generated by a touch from a user between the first touch sensors TS1 and the second touch sensors TS2 (mutual-capacitance sensing type).

When a touch is sensed in the mutual-capacitance sensing type, the first touch sensors TS1 may be connected to each other in a predetermined direction. Further, the second touch sensors TS2 may be connected to each other to cross the first touch sensors TS1.

The first touch sensors TS1 may be connected to a first touch line TL1 and the second touch sensors TS2 may be connected to a second touch line TL2.

In a touch sensing period, different levels of voltages are applied through the first touch line TL1 and the second touch line TL2, and when a user touches the touch display panel, a change in capacitance may occurs between the first touch sensors TS1 and the second touch sensors TS2.

The touch driving circuit 120, in a touch sensing period, drives the first touch sensors TS1 and the second touch sensors TS2 and senses a change in capacitance between the first touch sensors TS1 and the second touch sensors TS2.

The touch driving circuit 120 converts a sensed value into digital data and transmits the digital data to the touch controller such that the touch controller can sense whether there is a touch and the touch position using the digital data.

The touch driving circuit 120 may be configured separately from the data driving circuit that drives the data lines, and may be configured as a single chip.

Figure 2:
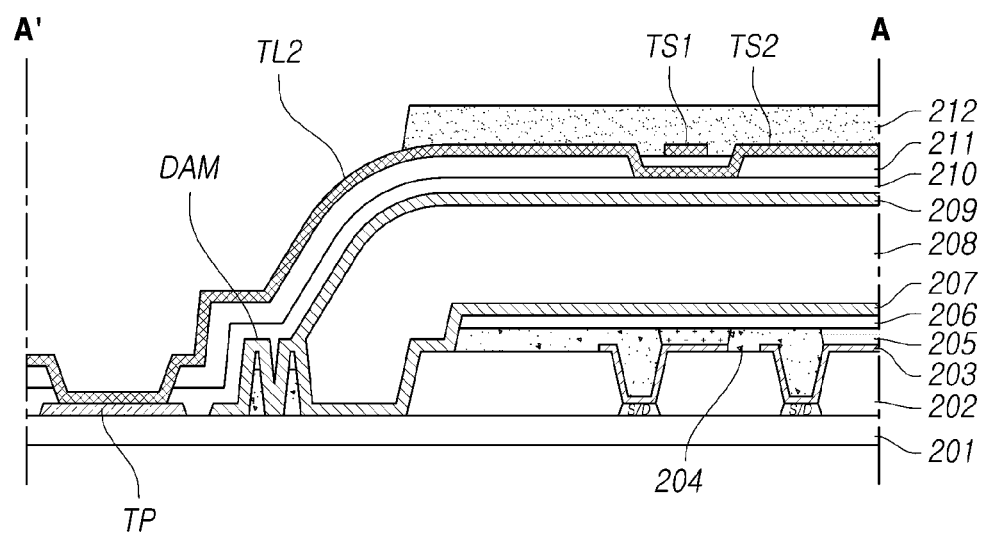
FIG. 2 is a cross-sectional view taken along line A-A' of FIG. 1 when the touch display device shown in FIG. 1 is an organic light emitting display device.

FIG. 2 is a cross-sectional view taken along line A-A' of the touch display device 100 shown in FIG. 1, in which an area adjacent to a portion where a touch sensor TS and the touch driving circuit 120 are connected to each other is shown.

Referring to FIG. 2, source/drain electrodes S/D for display driving are disposed on a polyimide layer 201. A touch pad TP to which a touch line TL is connected may be disposed. The touch pad TP may be made of the same material as the source/drain electrodes S/D.

A first planarization layer 202 is disposed on the source/drain electrode S/D and contact holes are formed on the first planarization layer 202 at the portions corresponding to the source/drain electrodes S/D.

A first electrode layer 203 is disposed on the first planarization layer 202. The first electrode layer 203 may be connected with the source/drain electrodes S/D through the contact holes of the first planarization layer 202. The first electrode layer 203 may be an anode.

An organic light emitting layer 205 is disposed on the first electrode layer 203 and a bank layer 204 may be disposed in the area where the organic light emitting layer 205 is not disposed.

A second electrode layer 206 is disposed on the organic light emitting layer 205. The second electrode layer 206 may be a cathode.

A first protective layer 207, a second protective layer 208 and a third protective layer 209 may be stacked on the second electrode layer 206. It can be considered that the first protective layer 207, a second protective layer 208, and a third protective layer 209 etc. constitute one encapsulation layer ENCAP.

The encapsulation layer ENCAP may form a dam DAM having a predetermined height to prevent collapse at an inclined portion.

A structure for touch sensing may be formed on the fundamental structure for display driving.

A touch buffer layer 210 is disposed on the encapsulation layer ENCAP and a touch insulating layer 211 is disposed on the touch buffer layer 210.

A touch sensor TS and a touch line TL etc. may be disposed on the touch insulating layer 211 and a second planarization layer 212 may be disposed on the touch sensor TS and the touch wire TL. The second planarization layer 212 may be an overcoat layer OC.

When touch sensors TS are disposed in a structure for mutual-capacitance sensing type, the joint of first touch sensors TS1 and the joint of second touch sensors TS2 may cross each other.

In this case, as shown in FIG. 2, second touch sensors TS may be connected through a metal disposed under the touch insulating layer 211. The metal connecting the second touch sensors TS2 is also called a "bridge metal"

As described above, by providing the structure in which a touch sensor TS and a touch layer TL are arranged on an encapsulation layer ENCAP in an organic light emitting display device, the configuration for touch sensing can be easily formed in a panel.

When White Organic Light Emitting Diodes (W-OLED) are used in the light emitting display device that can sense a touch, a color filter CF may be disposed on the encapsulation layer ENCAP.

Figure 3:
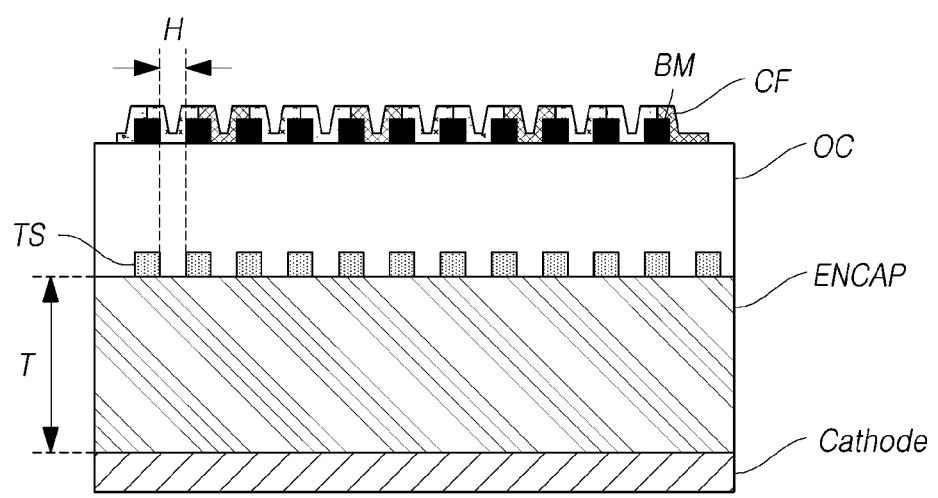
FIGS. 3 and 4 are views schematically showing arrangements of touch sensors when the touch display device according to aspects of the present disclosure is an organic light emitting display device.
Figure 4:
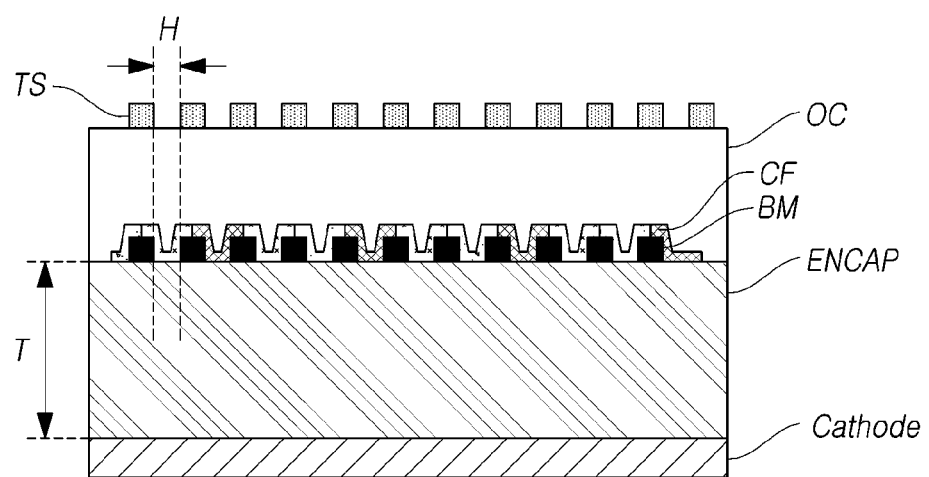

FIGS. 3 and 4 show examples of a cross-section with touch sensors TS and a color filter CF disposed on an encapsulation layer ENCAP.

Referring to FIGS. 3 and 4, an encapsulation layer ENCAP may be disposed on a cathode and touch sensors TS may be disposed on the encapsulation layer ENCAP.

By forming the encapsulation layer ENCAP to a predetermined thickness T or greater (e.g., 5 μm or greater), it is possible to reduce parasitic capacitance between the cathode and the touch sensors TS. Accordingly, it is possible to prevent deterioration of the degree of touch sensitivity due to parasitic capacitance.

The touch sensors TS may be transparent electrodes or mesh type electrodes. When the touch sensors TS are mesh type electrodes with a hole H, the holes H of the touch sensors TS may be positioned to correspond to the light emission areas of subpixels.

It is possible to enable the organic light emitting display device to sense a touch without deteriorating the light emission performance by disposing the holes H of the touch sensors TS to correspond to the light emission area of the subpixels.

The color filter CF is disposed on the encapsulation layer ENCAP and the vertical positions of the color filter CF and the touch sensors TS can be changed in various ways.

For example, as shown in FIG. 3, the color filter CF and a black matrix BM may be disposed on the touch sensors TS. Further, the color filter CF and the black matrix BM may be disposed on an overcoat layer OC on the touch sensors TS.

Alternatively, as shown in FIG. 4, the color filter CF and the black matrix BM may be disposed under the touch sensors TS. The touch sensors TS may be disposed on an overcoat OC on the color filter CF and the black matrix BM.

That is, the positional relationship between the touch sensors TS and the color filter CF may be determined in the optimal positional relationship in consideration of the touch performance and the display performance.

Therefore, according to aspects of the present disclosure, it is possible to overcome a difficulty in forming touch sensors TS in a panel of an organic light emitting display device and to sense a touch without deteriorating the display performance.

The touch display device 100 can have a structure in which a non-active area N/A is decreased and an active area A/A is increased in the touch display panel 110 due to the requirement for increasing the active area A/A where images are displayed.

Accordingly, the configuration that is disposed in the non-active area N/A can be positioned in the active area A/A, and in this case, it may be difficult to design touch sensors TS and touch lines TL for touch sensing.

Figure 5A:
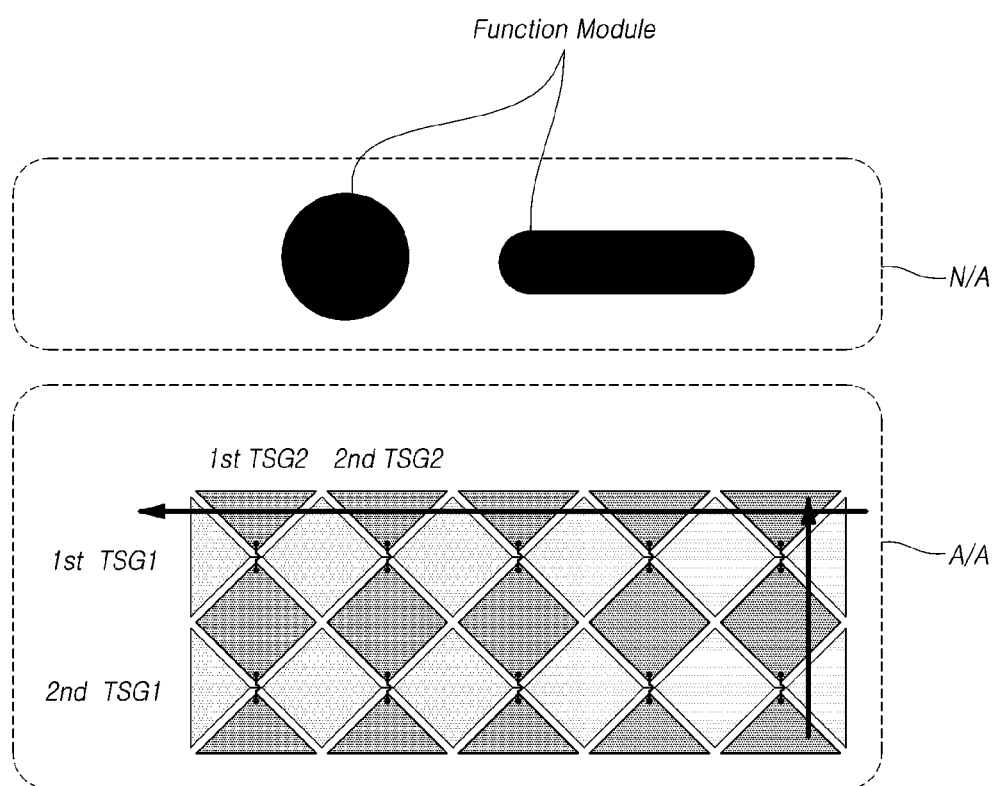
FIGS. 5A and 5B are views showing a positional relationship between a function module and touch sensors when a touch display panel according to aspects of the present disclosure includes a function module.
Figure 5B:
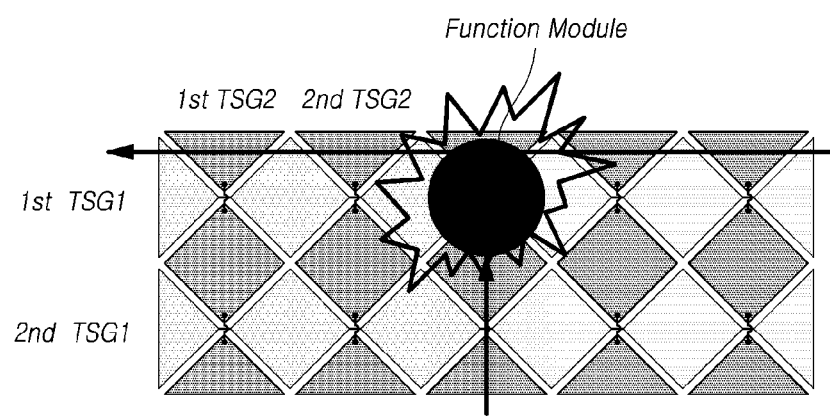

FIGS. 5A and 5B show examples of structures that are changed when the active area A/A is expanded in the touch display panel 110.

Referring to FIG. 5A, touch sensors TS may be disposed in the active area A/A of the touch display panel 110, and function modules such as a camera and a speaker may be disposed in the non-active area N/A.

As the active area A/A of the touch display panel 110 is expanded, the function modules in the non-active area N/A may be positioned in the active area A/A.

Referring to FIG. 5B, function modules such as a camera and a speaker are positioned in the active area A/A, and overlap touch sensors TS in the active area A/A.

Accordingly, it is difficult to design touch sensors TS and touch lines TL in the touch display panel 110 having the structure with an expanded active area A/A. Further, a new structure of touch sensors TS and touch lines TL is required to provide a touch sensing function to the area surrounding the function modules.

Aspects of the present disclosure provide a touch display panel 110 and a touch display device 100 that have a structure being able to sense a touch even if an active area A/A is expanded.

Figure 6:
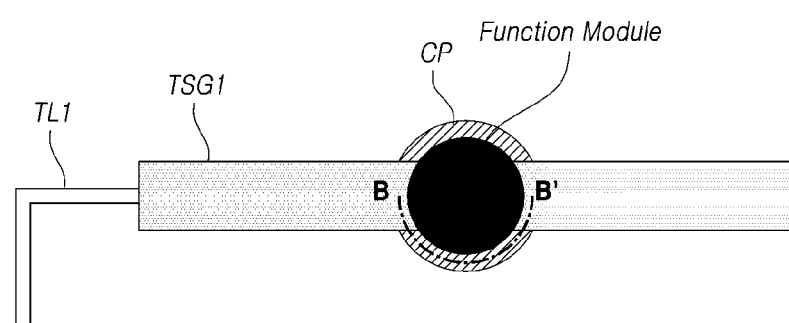
FIG. 6 is a view showing a first aspect of a connection structure of touch sensors disposed around a function module in a touch display panel according to aspects of the present disclosure.
Figure 6:
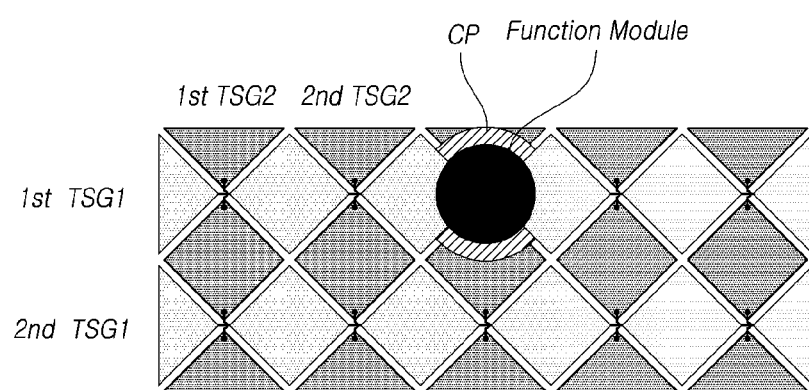

FIG. 6 shows a first aspect of the structure of touch sensors TS around a function module and a connection structure of the touch sensors TS in the touch display panel 110 according to aspects of the present disclosure.

Referring to FIG. 6, multiple touch sensors TS are disposed in an active area A/A of the touch display panel 110 according to the first aspect.

The touch sensors TS may be composed of first touch sensors TS1 connected in an X-axial direction and second touch sensors TS2 connected in a Y-axial direction.

In the first touch sensors TS1, two or more first touch sensors TS1 arranged in the same row and connected in the X-axial direction can form one first touch sensor group TSG1. In the second touch sensors TS2, two or more second touch sensors TS2 arranged in the same row and connected in the Y-axial direction can form one second touch sensor group TSG2.

A touch driving signal can be applied to the first touch sensor group TSG1 through a first touch line TL1 in a touch sensing period. A signal having a different voltage level from the touch driving signal applied to the first touch sensor group TSG1 can be applied to the second touch sensor group TSG2 through a second touch line TL2.

That is, the first touch sensor group TSG1 and the second touch sensor group TSG2 cross each other and a touch can be detected by sensing a change in mutual capacitance between the first touch sensors TS1 of the first touch sensor group TSG1 and the second touch sensors TS2 of the second touch sensor group TSG2.

A function module may be disposed in the active area A/A where the touch sensors TS are disposed.

The function module may overlap the first touch sensor group TSG1 or the second touch sensor group TSG2.

When the function module overlaps the first touch sensor group TSG1, first touch sensors TS1 disposed at both sides of the function module of the touch sensors in the first touch sensor group TSG1 are arranged in a different way from the other first touch sensors TS1.

For example, when the function module has a circular shape, the outer sides of the first touch sensors TS1 at both sides of the function module may be arranged in the same or similar way to the outer side of the function module.

As the function module is disposed, a connecting pattern CP for connecting the two first touch sensors TS1 at both sides of the function module may be provided.

The connecting pattern CP may have curved shape corresponding to the outer side of the function module and may be arranged in various shapes in accordance with the external shapes of the function modules.

The connecting pattern CP connecting the first touch sensors TS1 adjacent to the function module may be disposed on the same layer as or a different layer from the first touch sensors TS1.

Figure 7A:
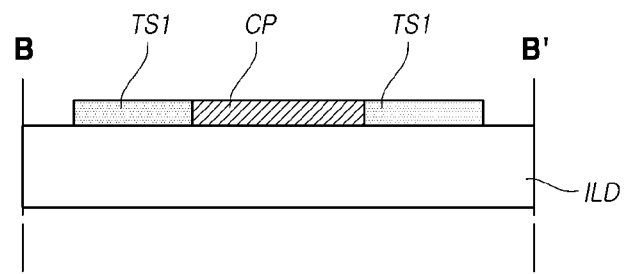
FIGS. 7A and 7B are cross-sectional views taken along line B-B' in the connection structure of touch sensors shown in FIG. 6.
Figure 7B:
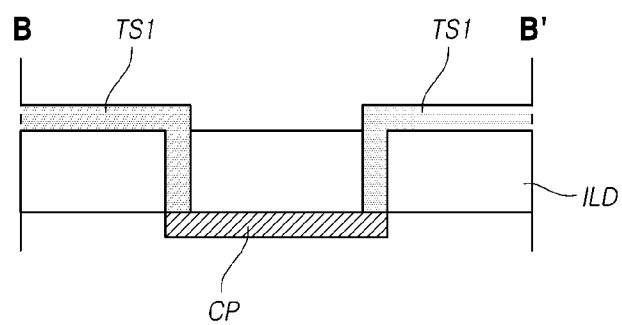

FIGS. 7A and 7B show examples in which a connecting pattern CP is disposed in a connection structure of the touch sensors TS shown in FIG. 6 and cross-sectional views taken along line B-B' of FIG. 6.

Referring to FIG. 7A, the connecting pattern CP connecting two first touch sensors TS1 adjacent to the function module may be formed on the same layer as the first touch sensors TS1.

Accordingly, it is possible to easily provide the connecting pattern CP in the process arranging the first touch sensors TS1.

Alternatively, the connecting pattern CP connected with the first touch sensors TS1 may be disposed on a different layer from the first touch sensors TS1.

Referring to FIG. 7B, the connecting pattern CP connecting two first touch sensors TS1 adjacent to the function module may be disposed under an insulating layer ILD disposed under the first touch sensors TS1.

The two first touch sensors TS1 adjacent to the function module can be connected with the connecting pattern CP under the insulating layer ILD through a hole formed through the insulating layer ILD.

The connecting pattern CP may be disposed on a layer where a bridge metal connecting second touch sensors TS2 to each other is disposed.

Accordingly, it is possible to easily form the connecting pattern CP without a specific process by forming the connecting pattern CP for connecting two first touch sensors TS1 in the process of forming the bridge metal connecting the second touch sensors TS2.

That is, according to various aspects of the present disclosure, when a function module is disposed in an active area A/A, touch sensors TS adjacent to the function module can be arranged in a changed shape in accordance with the external shape of the function module. Further, the connecting pattern CP connecting the touch sensors TS adjacent to the function module is disposed outside the function module so that a touch around the function module can be sensed.

As the arrangement of the touch sensors TS is changed and the connecting pattern CP connecting the touch sensors TS around the function module is provided, it is possible to sense a touch in the same way as the case without a function module even if there is no function module in the active area A/A.

The connecting pattern CP connecting the touch sensors TS adjacent to a function can be applied to the case in which a function module overlaps the second touch sensor group TSG2.

Figure 8:
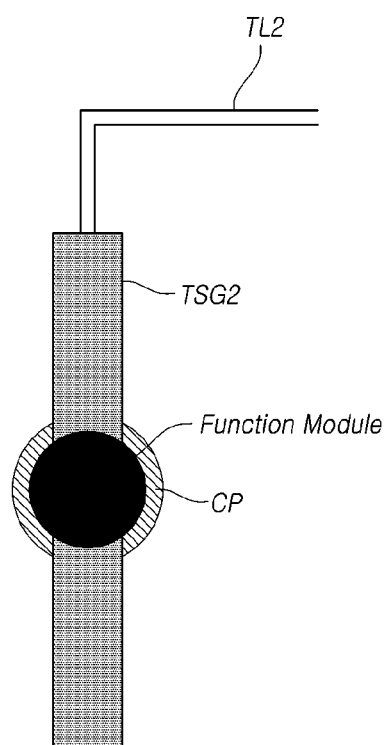
FIG. 8 is a view showing another example of the connection structure of touch sensors according to the first aspect.

FIG. 8 is a view showing another example of the connection structure of touch sensors according to the first aspect.

Referring to FIG. 8, a function module disposed in the active area A/A may overlap the second touch module TSG2.

Accordingly, two second touch sensors TS2 disposed adjacent to the function module are changed in shape corresponding to the external shape of the function module. The two second touch sensors TS2 disposed adjacent to the function module can be connected to each other through a connecting pattern CP disposed outside the function module.

The connecting pattern CP may be disposed on the same layer as or a different layer from the second touch sensors TS2.

When the connecting pattern CP is disposed on a different layer from the second touch sensors TS2, the connecting pattern CP may be formed on a layer where a bridge metal connecting the second touch sensors TS2 is disposed.

Accordingly, even if the function module overlaps the second touch sensor group TSG2, second touch sensors TS2 are disposed around the function module in structure corresponding to the external shape of the function module. Further, since two second touch sensors TS2 are connected to each other through the connecting pattern CP disposed outside the function module, it is possible to sense a touch by driving the second touch sensors TS in the same was as when there is no function module.

Meanwhile, the function module may overlap both of the first touch sensor group TSG1 arranged in the X-axial direction and the second touch sensor group TSG2 arranged in the Y-axial direction, depending on the shape of touch sensors TS.

Figure 9:
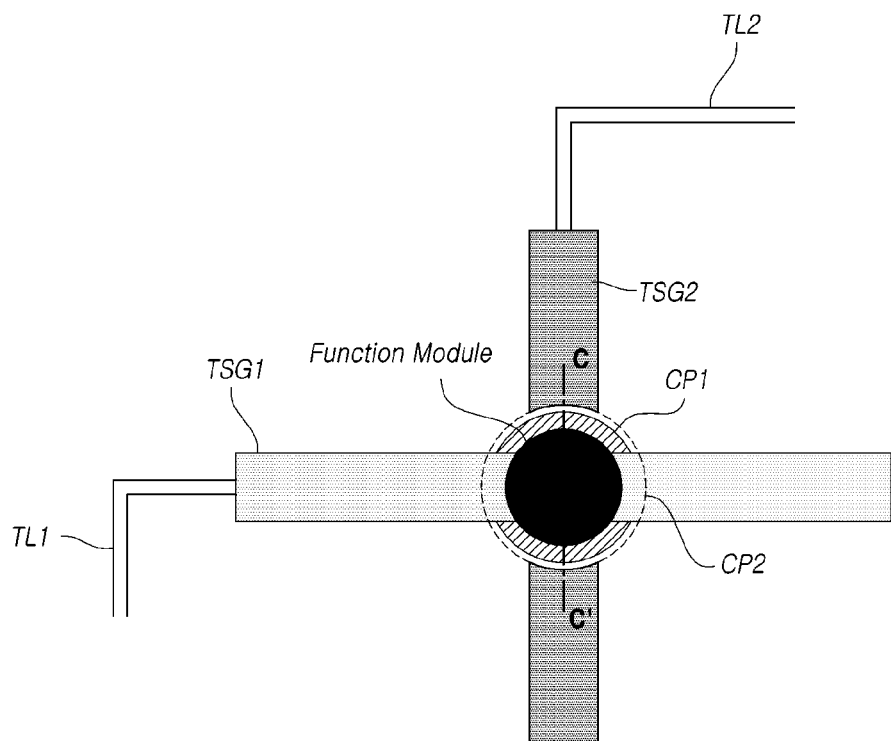
FIG. 9 is a view showing another example of the connection structure of touch sensors according to the first aspect.

FIG. 9 is a view showing another example of the connection structure of touch sensors TS according to the first aspect.

Referring to FIG. 9, a first touch sensor group TSG1 is arranged in a predetermined direction in the active area A/A of the touch display panel and a second touch sensor group TSG2 is arranged across the first touch sensor group TSG1.

The first touch sensor group TSG1 may include multiple first touch sensors TS1 connected to each other in the X-axial direction. The second touch sensor group TSG2 may include multiple second touch sensors TS2 connected to each other in the Y-axial direction.

A function module may be disposed at the cross area of the first touch sensor group TSG1 and the second touch sensor group TSG2.

Accordingly, first touch sensors TS1 and second touch sensors TS2 disposed adjacent to the function module are arranged in a structure corresponding to the external shape of the function module.

Two first touch sensors TS1 disposed adjacent to the function module are connected to each other through a first connecting pattern CP1 disposed outside the function module. Two second touch sensors TS2 disposed adjacent to the function module are connected to each other through a second connecting pattern CP1 disposed outside the function module.

The first connecting pattern CP1 and the second connecting pattern CP2 disposed outside the function module cross each other. Accordingly, the touch sensors TS adjacent to the function module can be connected to each other by disposing the first connecting pattern CP1 and the second connecting pattern CP2 on different layers.

For example, two first touch sensors TS1 included in the first touch sensor group TSG1 and disposed adjacent to the function module may be connected through the first connecting pattern CP1 disposed on the same layer as the first touch sensors TS1.

Further, two second touch sensors TS2 included in the second touch sensor group TSG2 and disposed adjacent to the function module may be connected through the second connecting pattern CP2 disposed on a different layer from the second touch sensors TS2.

Figure 10:
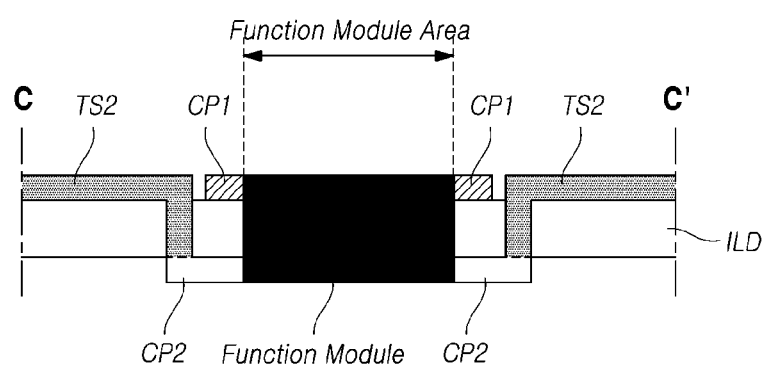
FIG. 10 is a cross-sectional view taken along line C-C' in the connection structure of touch sensors shown in FIG. 9.

FIG. 10 is a cross-sectional view taken along line C-C' in the connection structure of touch sensors TS shown in FIG. 9.

Referring to FIG. 10, the first connecting pattern CP1 connecting the two first touch sensors TS1 adjacent to the function module is disposed on the layer, where the touch sensors TS are disposed, and is connected with the first touch sensors TS1.

The second connecting pattern CP2 connecting the two second touch sensors TS2 adjacent to the function module may be disposed under the insulating layer ILD disposed under the second touch sensors TS2. The two second touch sensors TS2 adjacent to the function module may be connected with the second connecting pattern CP2 through a hole formed through the insulating layer ILD.

Accordingly, the first connecting pattern CP1 and the second connecting pattern CP2 overlap each other around the function module.

Since the two first touch sensors TS1 or the two second touch sensors TS2 that are adjacent to the function module are respectively connected to each other, it is possible to sense a touch around the function module.

The first connecting pattern CP1 disposed on the same layer as the first touch sensors TS1 and the second touch sensors TS2 is spaced apart from the second touch sensors TS2.

That is, the first connecting pattern CP1 connected with the first touch sensors TS1 is spaced apart from the second touch sensors TS2 and the second connecting pattern CP2 is spaced apart from the first touch sensor TS1, so there is no influence on sensing a touch using a change in mutual capacitance between the first touch sensors TS1 and the second touch sensors TS2.

The structure of the connecting patterns CP connecting touch sensors TS can be applied to a structure in which a function module is disposed at the joint of a touch sensor TS and a touch line TL.

Figure 11:
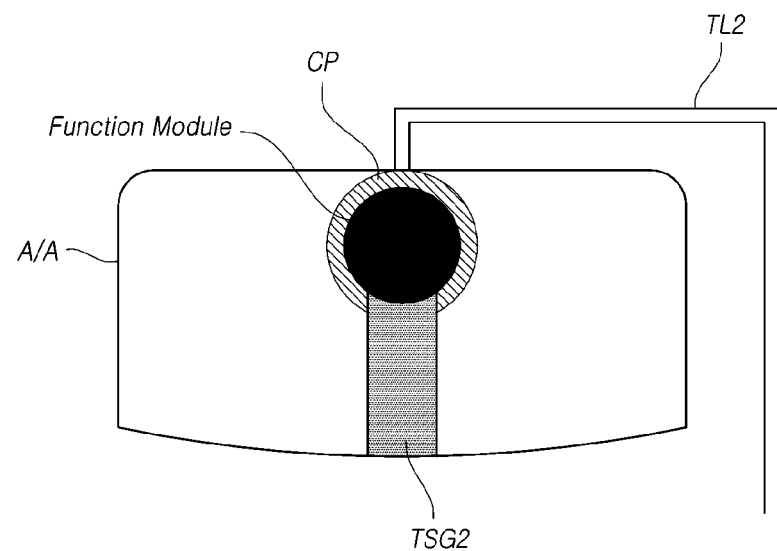
FIGS. 11 and 12 are views showing another example of the connection structure of touch sensors according to the first aspect.
Figure 11:
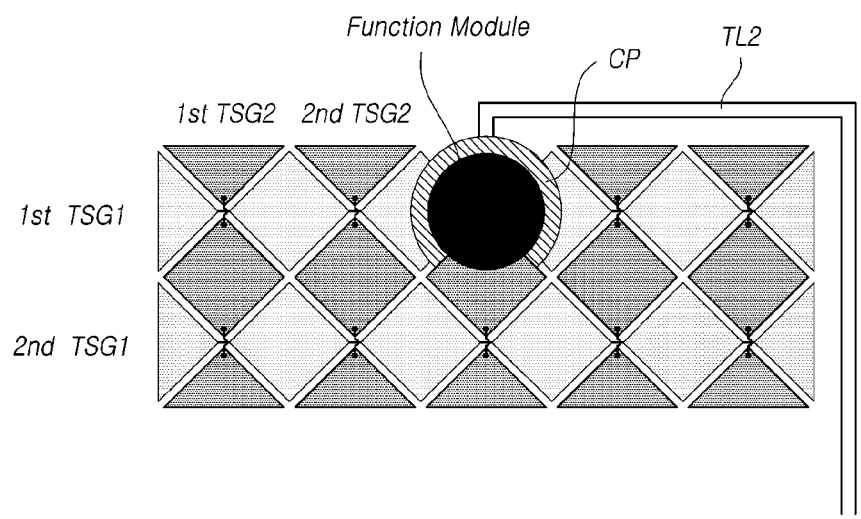
Figure 12:
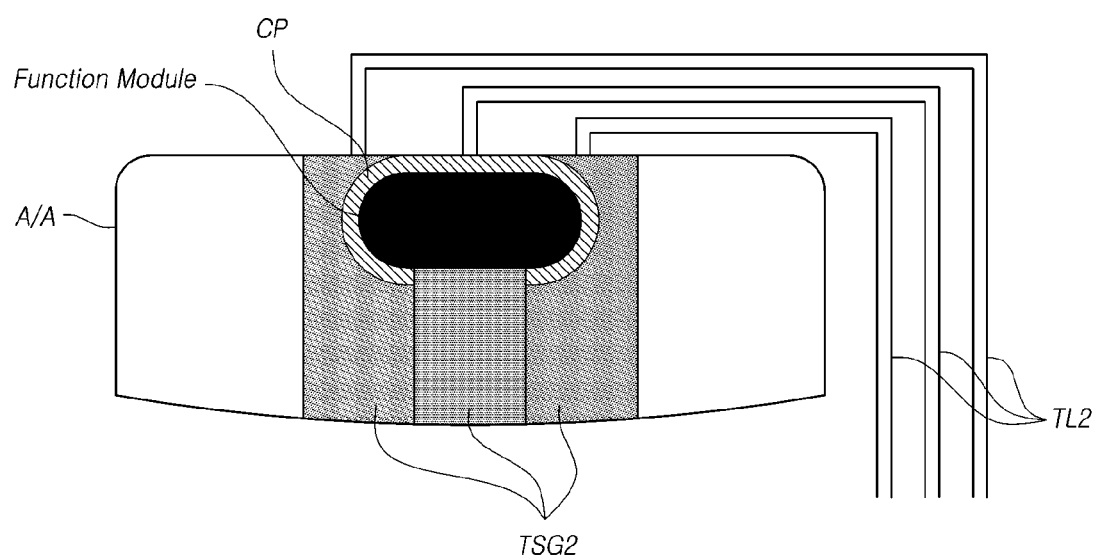

FIGS. 11 and 12 are views showing another example of the connection structure of touch sensors TS according to the first aspect.

Referring to FIG. 11, a first touch sensor group TSG1 including multiple first touch sensors TS1 and a second touch sensor group TSG2 including multiple second touch sensor group TS2 may be disposed across each other in the active area A/A of the touch display panel 110.

A function module may be further disposed to overlap touch sensors TS in the active area A/A.

The function module may be disposed to overlap the joint of a touch sensor TS and a touch line TL.

For example, the function module may be disposed to overlap the joint of the second touch line TL2 and the outermost second touch sensor TS2 of the second touch sensor group TSG2.

In this case, a connecting pattern CP having a predetermined shape according to the external shape of the function module may be disposed outside the function module. The connecting pattern CP can connect second touch sensors TS2 adjacent to the function module and the second touch line TL2 to each other.

The connecting pattern CP connecting the second touch sensors TS2 and the second touch line TL2 may be disposed on the same layer as or a different layer from the second touch sensors TS2.

Accordingly, in the structure with a function module positioned close to the outer side of an active area A/A, the touch sensors TS in the active area A/A and the touch line TL in the non-active area N/A can be connected to each other through the connecting pattern CP.

The structure connecting touch sensors TS or the structure connecting touch sensors TS and a touch line TL using a connecting pattern CP can be applied to the cases in which a function module has shapes other than a circle.

FIG. 12 shows an example of a structure connecting touch sensors TS and a touch line TL when an elliptical function module is disposed in an active area A/A.

Referring to FIG. 12, an elliptical function module may be disposed to overlap two or more second touch sensor groups TSG2 in an active area A/A.

In FIG. 12, a function module is disposed to overlap three second touch sensor group TSG2, in which two second touch sensor groups TSG2 at the center of the three second touch sensor groups TSG2 are difficult to be connected to a second touch line TL2 due to the function module.

In this case, a connecting pattern CP is disposed outside the function module so that the second touch sensor groups TSG2 at the center are connected to the second touch line TL2 by the connecting pattern CP.

The structure of the connecting pattern CP that is applied when a function module has various shapes can be applied not only to the case in which a function module is disposed to overlap the joint of a touch sensor TS and a touch line TL, but to the case in which a function module is disposed between two touch sensors TS.

A structure in which a function module is disposed in an active area A/A was exemplified to describe a structure of touch sensors TS and a connecting pattern CP according to aspects of the present disclosure, but the structure can be applied to the case in which a function module is disposed in an area, where images are not displayed, in an active area A/A or the case in which the active area A/A has other shapes.

Aspects of the present disclosure can provide a structure in which a touch sensor TS and a touch line TL etc. are connected through a connecting pattern CP disposed outside a function module, but it may be possible to connect a touch sensor TS and the touch line TL using an area where a signal line is disposed in a function module.

Figure 13:
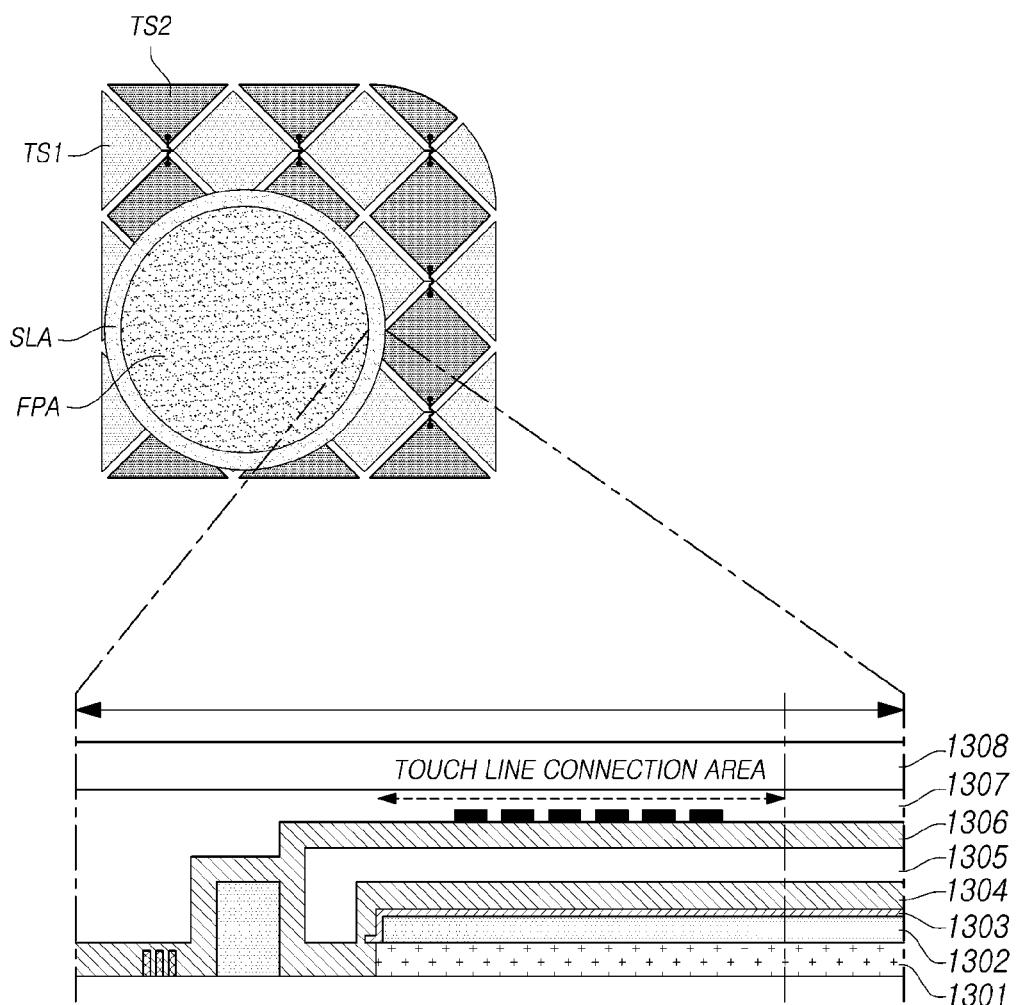
FIGS. 13 and 14 are views showing a second aspect of a connection structure of touch sensors disposed around a function module in a touch display panel according to aspects of the present disclosure.
Figure 14:
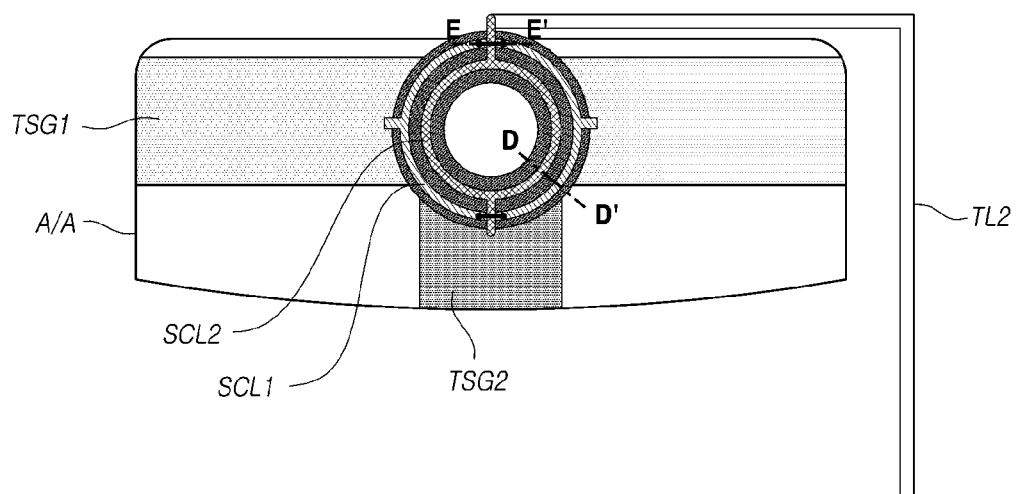

FIGS. 13 and 14 are views showing a second aspect of a connection structure of touch sensors TS disposed around a function module in a touch display panel 110 according to aspects of the present disclosure.

Referring to FIG. 13, a function module disposed in the active area A/A can be divided into a function performing area FRA where the functions of the function module are performed and a signal line area SLA where signal lines, to which signals for driving the function module are applied, etc. are disposed.

The function performing area FPA may be an area where a lens is disposed if the function module is a camera or an area where sound is output if the function module is a speaker. The signal line area SLA is also called a "bezel area".

Signal lines to which signals for driving the function module are applied may be disposed in the signal line area SLA of the function module and there may be a spare area other than the space where the signal lines are disposed.

A sensor connection line SCL that is connected to touch sensors TS or touch lines TL is disposed in the spare area so that touch sensors TS or touch lines TL adjacent to the function module can be connected.

In the cross-section of the signal line area SLA, a module line layer 1301 where signal lines for driving the function module are disposed may be disposed in the signal line area SLA, and a first insulating layer 1302 and an electrode layer 1303 may be disposed on the module line layer 1301.

A first cover layer 1304, a second cover layer 1305, a third cover layer 1306 are disposed on the electrode layer 1303 and protect the signal lines for driving the function module.

A second insulating layer 1307 and a third insulating layer 1308 may be disposed on the third cover layer 1306.

Accordingly, a sensor connection line SCL for touch sensors TS or touch lines TL may be disposed in a space in which signal lines for driving the function module are not disposed and that does not influence signal lines in the signal line area SLA.

For example, the sensor connection line SCL may be disposed on the third cover layer 1306.

A structure in which touch sensors TS or touch lines TL adjacent to the function module are connected through the sensor connection line SCL can be provided.

Referring to FIG. 14, a first touch sensor group TSG1 and a second touch sensor group TSG2 are disposed across each other in the active area A/A. A function module may be further disposed to overlap the first touch sensor group TSG1 in the active area A/A. The function module may be disposed to overlap the joint of the second touch sensor group TSG2 and a second touch line TS2.

In this structure, two first touch sensors TS1 adjacent to the function module can be connected to each other through a first sensor connection line SCL1 disposed in the signal line area SLA of the function module.

Further, second touch sensors TS2 and a second touch line TL2 adjacent to the function module can be connected to each other through a second sensor connection line SCL2 disposed in the signal line area SLA of the function module.

Accordingly, since the touch sensors TS and touch lines TL adjacent to the function module are connected to each other through the sensor connection lines SCL in the signal line area SLA, it is possible to prevent reduction of the area where touch sensors TS are disposed due to a connecting pattern CP that is disposed outside the function module.

Figure 15A:
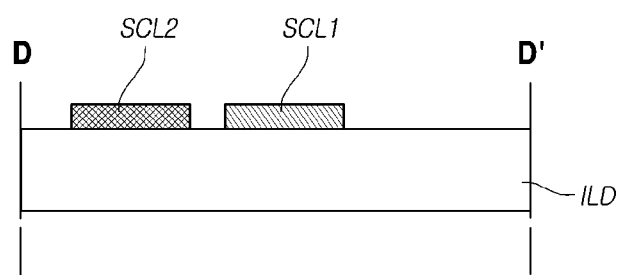
FIG. 15A is a cross-sectional view taken along line D-D' in the connection structure of touch sensors shown in FIG. 14.
Figure 15B:
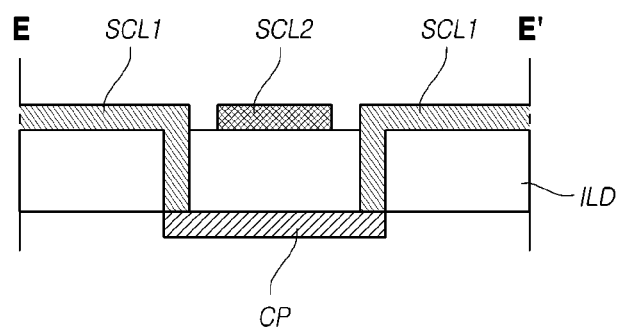
FIG. 15B is a cross-sectional view taken along line E-E' in the connection structure of touch sensors shown in FIG. 14.

FIGS. 15A and 15B are views showing an example of a cross-section of the signal line area SLA shown in FIG. 14. FIG. 15A is a cross-sectional view taken along line D-D' and FIG. 15B is a cross-sectional view taken along line E-E'.

Referring to FIG. 15A, the first sensor connection line SCL1 and the second sensor connection line SCL2 are disposed without crossing each other.

Accordingly, the first sensor connection line SCL1 and the second sensor connection line SCL2 can be disposed on the same layer.

Referring to FIG. 15B, the first sensor connection line SCL1 and the second sensor connection line SCL2 may be disposed across each other.

That is, the first sensor connection line SCL1 and the second sensor connection line SCL2 are connected respectively to a first touch sensor group TSG1 and a second touch sensor group TSG2 that cross each other, so they can cross each other at least at one point in the signal line area SLA of the function module.

Any one of the sensor connection lines SCL may be disposed on a different layer at the cross point of the first sensor connection line SCL1 and the second sensor connection line SCL2.

For example, the first sensor connection line SCL1 may be connected through a connecting pattern CP disposed under an insulating layer ILD, at the cross point of the first sensor connection line SCL1 and the second sensor connection line SCL2.

Since there is a portion where the insulating layer ILD is stacked in the signal line area SLA of the function module, by disposing any one of the sensor connection lines SCL over or under the insulating layer ILD, the first sensor connection line SCL1 and the second sensor connection line SCL2 can connect touch sensors TS or touch lines TL while crossing each other.

As described above, it is possible to connect touch sensors TS or touch lines TL adjacent to a function module through sensor connection lines SCL disposed in the signal line area SLA of the function module or a connecting pattern CP disposed outside the function module, but it is possible to sense a touch around the function module by adjusting the touch line TL connected to one touch sensor group TSG.

Figure 16:
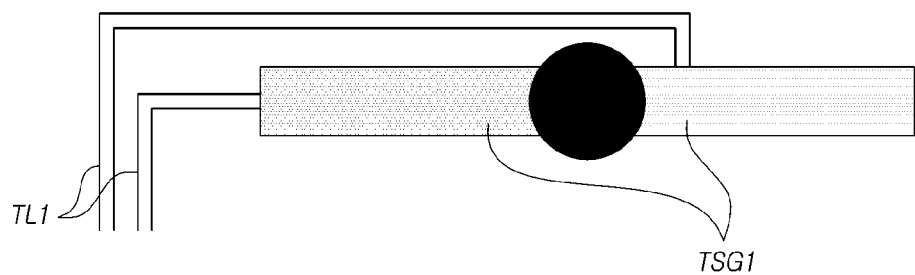
FIGS. 16 and 17 are views showing a third aspect of a connection structure of touch sensors disposed around a function module in a touch display panel according to aspects of the present disclosure.
Figure 16:
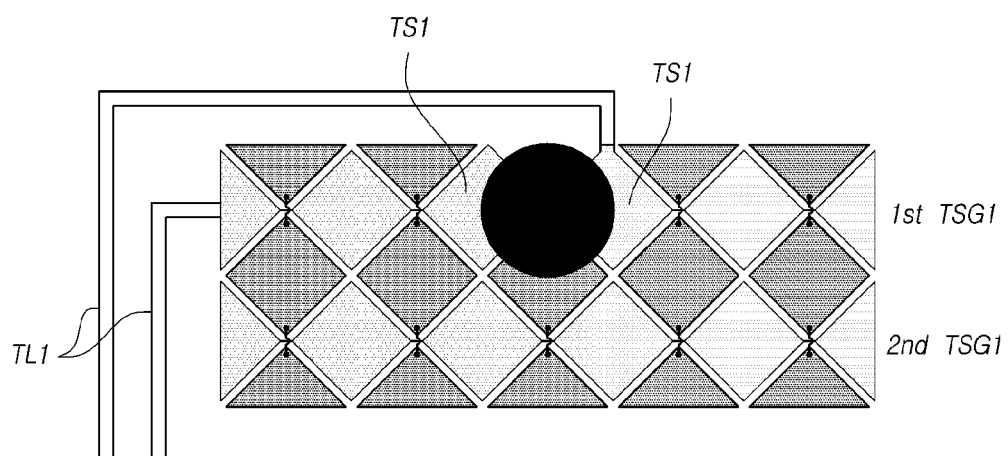
Figure 17:
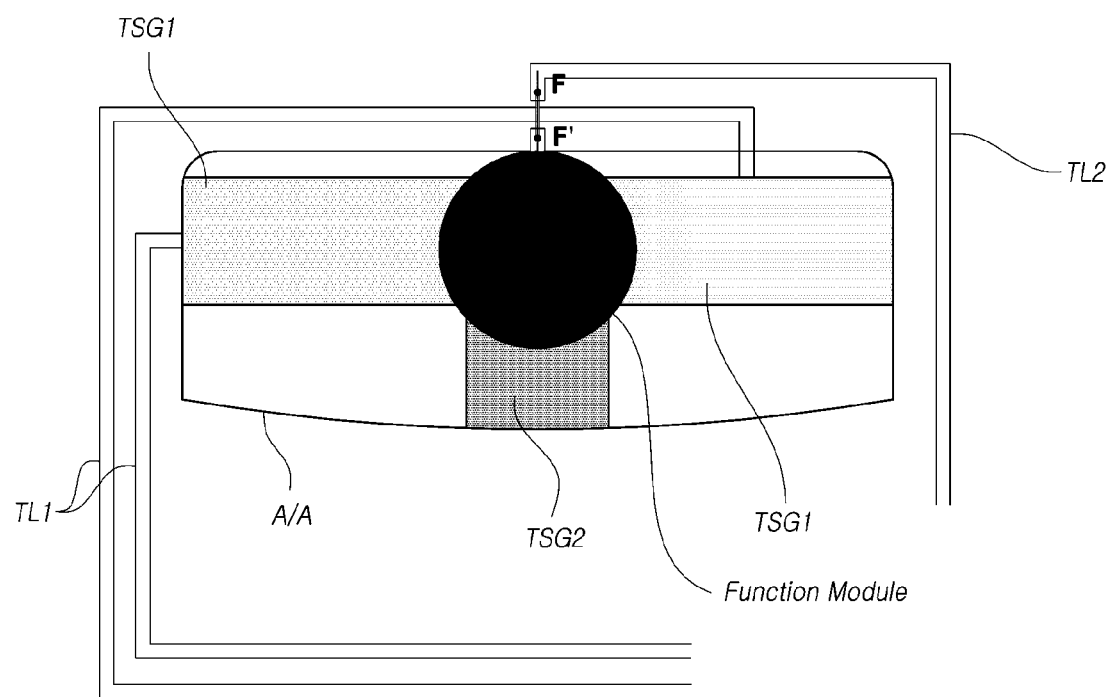

FIGS. 16 and 17 are views showing a third aspect of a connection structure of touch sensors TS in a touch display panel 110 according to aspects of the present disclosure.

Referring to FIG. 16, a first touch sensor group TSG1 including multiple touch sensors TS1 connected in the X-axial direction is disposed in an active area A/A. A function module may be further disposed to overlap the first touch sensor group TSG1.

Two first touch sensors TS1 adjacent to the function module may be connected to different first touch lines TL1.

For example, the first touch sensor group TSG1 disposed at the left side of the function module is connected to a first touch line TL1 disposed at the left side of the active area A/A. Further, the first touch sensor group TSG1 disposed at the right side of the function module is connected to a first touch line TL1 disposed over and at the right side of the active area A/A.

As the two first touch sensor groups TSG1 adjacent to the function module are connected to different first touch lines TL1, there may be no need for a connecting pattern CP for connecting first touch sensors TS1 adjacent to the function module.

The first touch sensors TS1 included in the first touch sensor groups TSG1 are divided into two groups, so resistance is reduced and the degree of touch sensitivity can be improved.

Since the first touch line TL1 is disposed over the active area A/A, it can cross a second touch line TL2 disposed over the active area A/A.

Referring to FIG. 17, a first touch sensor group TSG1 adjacent to a function module is divided into two groups and connected to different first touch lines TL1. A second touch line TL2 connected to a second touch sensor group TSG2 disposed to overlap or not to overlap the function module may be disposed over an active area A/A.

Accordingly, a first touch lines TL1 and the second touch line TL2 can cross each other over the active area A/A.

Any one of the touch lines TL may be disposed on a different layer at the cross point of the first touch line TL1 and the second touch line TL2.

Figure 18:
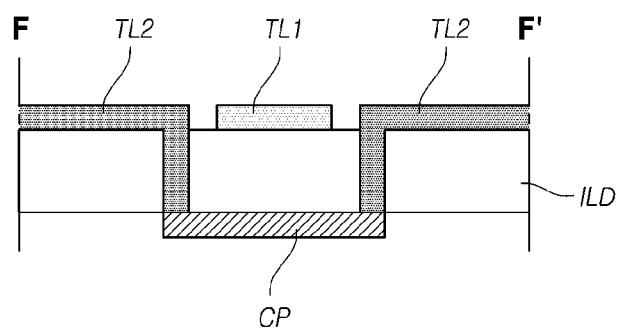
FIG. 18 is a cross-sectional view taken along line F-F' in the connection structure of touch sensors shown in FIG. 17.

FIG. 18 is a cross-sectional view taken along line F-F' where the first touch line TL1 and the second touch line TL2 cross each other in the connection structure of touch sensors shown in FIG. 17.

Referring to FIG. 18, the second touch line TL2 can be connected through a connecting pattern CP disposed under an insulating layer ILD at the cross point of the first touch line TL1 and the second touch line TL2.

Accordingly, since the first touch line TL1 and the second touch line TL2 can cross each other over the active area A/A, a touch sensor group TSG adjacent to the function module can be divided into two groups and connected to different touch lines TL.

Furthermore, as described above, touch sensor groups TSG disposed in the same row or same line can be divided into two groups and connected to different touch lines TL to reduce resistance.

That is, in the touch display panel 110 according to aspects of the present disclosure, a touch sensor group TSG may be connected to one touch line TL, or may be divided into two groups and connected to different touch lines TL to reduce resistance, or may be divided into two groups in an area overlapping a function module and connected to different touch lines TL.

According to aspects of the present disclosure, in a structure in which an area where images are not displayed such as an area where a function module is disposed is included in an active area A/A, touch sensors TS can be connected through a connecting pattern CP outside the area, so it is possible to sense a touch around the area.

Furthermore, when a function module is disposed in an active area A/A, a sensor connection line SCL is disposed in some of a signal line area where signal lines for driving the function module are disposed, whereby it is possible to provide a touch sensing function without reduction of the area where touch sensors TS are disposed due to a connecting pattern CP.

Furthermore, by connecting touch sensors TS adjacent to a function module through different touch lines TL, it is possible to increase the degree of touch sensitivity and to sense a touch around the function module.

Although the aspects of the present disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the present disclosure have been described for the sake of brevity and clarity. The scope of the present disclosure shall be construed on the basis of the accompanying claims in such a manner that all of the technical ideas included within the scope equivalent to the claims belong to the present disclosure.

What is claimed is:

1. A touch display device comprising:
 a display panel having an active area where images are displayed and a non-active area disposed outside the active area;
 at least one function module disposed in the active area, and comprising a function performing area for performing a function of the function module and a signal line area surrounding the function performing area;

a plurality of first touch sensor groups disposed in a first direction in the active area and each including one or more first touch sensors;

a plurality of second touch sensor groups disposed in a second direction crossing the first direction in the active area and each including one or more second touch sensors;

a plurality of first touch lines disposed in the non-active area and electrically connected with the plurality of first touch sensor groups;

a plurality of second touch lines disposed in the non-active area and electrically connected with the plurality of second touch sensor groups;

a plurality of sensor connection lines disposed in the signal line area and connecting among the one or more first and second touch sensors and the first and second touch lines that are adjacent to the function module; and an encapsulation layer disposed under the plurality of sensor connection lines, wherein the encapsulation layer comprises a first cover layer, a second cover layer disposed on the first cover layer, and a third cover layer disposed on the second cover layer, and a part of the first cover layer contacts with a part of the third cover layer in the signal line area which is surrounded by at least two first touch sensors and at least two second touch sensors, wherein the part of the first cover layer which contacts the part of the third cover layer surrounds the function performing area, and wherein the at least one function module includes at least one first sensor connection line is disposed in the signal line area and connecting two adjacent first touch sensors disposed at both sides of the function module, at least one second sensor connection line is disposed in the signal line area and connecting two adjacent second touch sensors disposed at both sides of the at least one function module; and an insulating layer disposed under the first sensor connection line and the second sensor connection line, wherein one of the first sensor connection line and the second sensor connection line is disposed under the insulating layer where the first sensor connection line and the second sensor connection line cross each other.

2. The touch display device of claim 1, wherein the at least one function module is disposed between two adjacent first touch sensors of the plurality of first touch sensor groups, and at least one first connecting pattern is disposed on the same as a layer where the plurality of first touch sensors is disposed, outside the function module, and connecting the two adjacent first touch sensors through one of the sensor connection lines.

3. The touch display device of claim 1, wherein the at least one function module is disposed between two adjacent second touch sensors of the plurality of second touch sensor groups, and wherein at least one second connecting pattern is disposed on a layer different from a layer where the plurality of second touch sensors are disposed, outside the function module, and connecting the two adjacent second touch sensors through one of the sensor connection lines.

4. The touch display device of claim 1, wherein the at least one function module is disposed between two adjacent first touch sensors of the plurality of first touch sensor groups and two second touch sensors of the plurality of second touch sensor groups, and further comprising at least one first connecting pattern disposed on the same as a layer where the first touch sensors are disposed, outside the function module, and connecting the two adjacent first touch sensors through one of the sensor connection lines; and at least one second connecting pattern disposed on a layer different from the layer where the second touch sensors are disposed, outside the function module, and connecting the two adjacent second touch sensors through one of the sensor connection lines.

5. The touch display device of claim 4, wherein the at least one first connecting pattern has a portion overlaps a portion of the at least one second connecting pattern.

6. The touch display device of claim 4, wherein the at least one first connecting pattern and the second touch sensor are spaced apart from each other.

7. The touch display device of claim 1, further comprising:

a third connecting pattern disposed outside the at least one function module and connecting the first touch line and the plurality of first touch sensor groups to each other or connecting the second touch line and the plurality of second touch sensor groups to each other.

8. The touch display device of claim 1, wherein two adjacent first touch sensors disposed at both sides of the function module are electrically connected with two different first touch lines, and at least one of the two different first touch lines overlaps the second touch line.

9. The touch display device of claim 1, wherein the function module performs non-display related functions.

10. The touch display device of claim 1, wherein the encapsulation layer includes a dam having a predetermined height, and the dam is disposed between the active area and the touch pad, and at least one of the first touch line and the second touch line pass over the dam.

11. The touch display device of claim 1, wherein the sensor connection lines comprising:

at least one first sensor connection line connecting two adjacent first touch sensors separated by the function module; and at least one second sensor connection line connecting two adjacent second touch sensors separated by the function module, and the at least one first sensor connection line surrounding the at least one second sensor connection line.

12. The touch display device of claim 11, wherein the first sensor connection line and the second sensor connection line are disposed on a same layer.

13. The touch display device of claim 1, wherein the sensor connection lines are disposed on a different layer with the signal lines, and at least a part of the sensor connection lines are overlapped with the signal lines.

14. The touch display device of claim 1, further comprising:

a touch pad disposed in the non-active area, wherein the encapsulation layer has a sloped surface between the active area and the touch pad, and wherein at least one of the first touch line and the second touch line is disposed on the sloped surface of the encapsulation layer to correspond to the sloped surface, and is electrically connected to the touch pad.

15. The touch display device of claim 1, wherein a part of the third cover layer adjacent to the function performing area is located lower than other part of the third cover layer far from the function performing area.

16. A touch display panel comprising:

an active area where images are displayed;

at least one function module disposed in the active area, and comprising a function performing area for performing a function of the function module and a signal line area surrounding the function performing area;

a plurality of first touch sensor groups disposed in a first direction in the active area and each including one or more first touch sensors;

a plurality of second touch sensor groups disposed in a second direction crossing the first direction in the active area and each including one or more second touch sensors;

a plurality of first touch lines disposed in the non-active area and electrically connected with the plurality of first touch sensor groups;

a plurality of second touch lines disposed in the non-active area and electrically connected with the plurality of second touch sensor groups;

a plurality of sensor connection lines disposed in the signal line area and connecting among the one or more first and second touch sensors and the first and second touch lines that are adjacent to the function module; and an encapsulation layer disposed under the plurality of sensor connection lines, wherein the function module is disposed between two adjacent first touch sensors of the plurality of first touch sensor groups, or between two adjacent second touch sensors of the plurality of second touch sensor groups, or between two adjacent first touch sensors of the plurality of first touch sensor groups and two adjacent second touch sensors of the plurality of second touch sensor groups, wherein the encapsulation layer comprises a first cover layer, a second cover layer disposed on the first cover layer, and a third cover layer disposed on the second cover layer, and a part of the first cover layer contacts with a part of the third cover layer in the signal line area which is surrounded by at least two first touch sensors and at least two second touch sensors, wherein the part of the first cover layer which contacts the part of the third cover layer surrounds the function performing area, and wherein the at least one function module includes at least one first sensor connection line is disposed in the signal line area and connecting two adjacent first touch sensors disposed at both sides of the function module, at least one second sensor connection line is disposed in the signal line area and connecting two adjacent second touch sensors disposed at both sides of the at least one function module; and an insulating layer disposed under the first sensor connection line and the second sensor connection line, wherein one of the first sensor connection line and the second sensor connection line is disposed under the insulating layer where the first sensor connection line and the second sensor connection line cross each other.

17. The touch display panel of claim 16, further comprising one or more connecting patterns disposed outside the function module and connecting two adjacent first touch sensors disposed at both sides of the function module or connecting two adjacent second touch sensors disposed at both sides of the function module through one of the sensor connection lines.

18. The touch display panel of claim 16, wherein the function module performs non-display related functions.

* * * * *